US011961274B2

(12) United States Patent
Jafek et al.

(10) Patent No.: US 11,961,274 B2
(45) Date of Patent: Apr. 16, 2024

(54) SYSTEM AND METHOD FOR DETECTING AND TRACKING AN OBJECT

(71) Applicant: Aurora Flight Sciences Corporation, a subsidiary of The Boeing Company, Manassas, VA (US)

(72) Inventors: Benjamin Jafek, Somerville, MA (US); Samvruta Tumuluru, San Francisco, CA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 422 days.

(21) Appl. No.: 17/328,910

(22) Filed: May 24, 2021

(65) Prior Publication Data
US 2022/0012517 A1   Jan. 13, 2022

Related U.S. Application Data

(60) Provisional application No. 63/048,828, filed on Jul. 7, 2020.

(51) Int. Cl.
*G06V 10/20* (2022.01)
*G06F 18/20* (2023.01)
(Continued)

(52) U.S. Cl.
CPC .......... *G06V 10/255* (2022.01); *G06F 18/295* (2023.01); *G06V 10/751* (2022.01); *G06V 20/64* (2022.01); *G06V 10/759* (2022.01)

(58) Field of Classification Search
CPC .... G06V 10/255; G06V 20/64; G06V 10/751; G06V 10/759; G06F 18/295
See application file for complete search history.

(56) References Cited

U.S. PATENT DOCUMENTS

| 10,621,709 B1 * | 4/2020 | Henry ...................... G06T 5/007 |
| 2007/0210953 A1 * | 9/2007 | Abraham ............. G08G 5/0069 342/36 |

(Continued)

FOREIGN PATENT DOCUMENTS

KR   20200079013 A   7/2020

OTHER PUBLICATIONS

John Lai et al., "Vision-Based Estimation of Airborn Target Pseudobearing Rate using Hidden Markov Model Filters", IEEE Transations on Aerospace and Electronic Systems, IEEE Service Center, Piscataway, NJ, US, vol. 49, No. 4, Oct. 1, 2013, pp. 2129-2145.

(Continued)

*Primary Examiner* — David Perlman
(74) *Attorney, Agent, or Firm* — MH2 Technology Law Group LLP

(57) ABSTRACT

A method includes receiving a first image that is captured at a first time. The method also includes detecting a location of a first object in the first image. The method also includes determining a region of interest based at least partially upon the location of the first object in the first image. The method also includes receiving a second image that is captured at a second time. The method also includes identifying the region of interest in the second image. The method also includes detecting a location of a second object in a portion of the second image that is outside of the region of interest.

20 Claims, 5 Drawing Sheets

(51) Int. Cl.
*G06V 10/75* (2022.01)
*G06V 20/64* (2022.01)

(56) References Cited

U.S. PATENT DOCUMENTS

2009/0015674 A1* 1/2009 Alley .................. G01C 11/025
348/E7.085
2018/0129882 A1* 5/2018 Seeber ...................... G06T 7/11

OTHER PUBLICATIONS

Extended European Search Report dated Dec. 14, 2021, EP Application No. 21182206.9, pp. 1-12.
Henriques et al., "High-Speed Tracking with Kernelized Correlation Filters," IEEE Transactions on Pattern Analysis and Machine Intelligence, Nov. 2014, 14 pages.
Lai et al., "Characterisation of Sky-Region Morphological-Temporal Airborne Collision Detection," Journal of Field Robotics, 2013, 31 pages.
Liu et al., "SSD: Single Shot MultiBox Detector," Dec. 2016, arXiv:1512.02325v5 [cs.CV], 17 pages.
Lukezic et al., "Discriminative Correlation Filter with Channel and Spatial Reliability," Proceedings of the IEEE Conference on Computer Vision and Pattern Recognition (CVPR), 2017, pp. 6309-6318.
Redmon et al., "YOLOv3: An Incremental Improvement," Apr. 2018, 6 pages.
Wainwright et al., "Fusion of Morphological Images for Airborne Target Detection," 2012, Queensland University of Technology, 9 pages.

* cited by examiner

SYSTEM AND METHOD FOR DETECTING AND TRACKING AN OBJECT

CROSS-REFERENCE TO RELATED APPLICATIONS

This patent application claims priority to U.S. Provisional Patent Application No. 63/048,828, filed on Jul. 7, 2020, the entirety of which is incorporated by reference herein.

FIELD OF THE DISCLOSURE

The present disclosure is directed to tracking an aircraft. More particularly, the present disclosure is directed to detecting a first object (e.g., an aircraft) at long range, tracking the first object after it is detected, and then detecting a second object while the first object is being tracked.

BACKGROUND

Methods exist for detecting a single pixel or sub-pixel object in an image or video frame that corresponds to a moving aircraft at long range. These methods are referred to as dim object detection because the aircraft may not be discernable in every image or video frame. As a result, the detection problem is more difficult than can be solved by a conventional object detection neural network, and the subsequent tracking problem (i.e., tracking the detected object) is more difficult than can be solved by a conventional object tracker.

One conventional long-range air-to-air aircraft detector uses morphological image processing and track-before-detect hidden Markov models (HMMs). However, the HMM model used by this detector fixates on a single object (e.g., aircraft) and thus cannot detect more than one object at a time. In addition, once the object is detected in an image or video frame, the detector may switch back into a state of low detection probability. This may occur as the object moves away or due to noise in the image or video frame.

SUMMARY

A method is disclosed. The method includes identifying a first image that is captured at a first time. The method also includes detecting a location of a first object in the first image. The method also includes determining a region of interest based at least partially upon the location of the first object in the first image. The method also includes identifying a second image that is captured at a second time. The method also includes identifying the region of interest in the second image. The method also includes detecting a location of a second object in a portion of the second image that is outside of the region of interest.

A computing system is disclosed. The computing system includes one or more processors and a memory system. The memory system includes one or more non-transitory computer-readable media storing instructions that, when executed by at least one of the one or more processors, cause the computing system to perform operations. The operations include identifying a first image. The first image is captured by a camera on a first aircraft at a first time. The operations also include detecting a location of a first object in the first image. The first object is moving. The operations also include determining a region of interest based at least partially upon the location of the first object in the first image. The region of interest includes a plurality of pixels in the first image. Each pixel in the region of interest has a probability that is greater than a predetermined threshold that the first object will be located therein at a second time. The operations also include identifying a second image. The second image is captured by the camera on the first aircraft at the second time. The operations also include identifying the region of interest in the second image. The operations also include detecting a location of a second object in a portion of the second image that is outside of the region of interest, wherein the second object is moving.

In another example, the operations include identifying a first image. The first image is captured by a camera on a first aircraft at a first time. The operations also include detecting a location of a first object in the first image using a hidden Markov model. The first object is a second aircraft in flight. The first object is represented as five or fewer pixels in the first image. The operations also include determining a region of interest based at least partially upon the location of the first object in the first image. The first object is located within the region of interest. The region of interest includes a plurality of pixels in the first image. Each pixel in the region of interest has a probability that is greater than a predetermined threshold that the first object will be located therein at a second time. The second time is after the first time. The operations also include identifying a second image. The second image is captured by the camera on the first aircraft at the second time. The operations also include identifying the region of interest in the second image. The operations also include detecting the location of the first object in the region of interest in the second image using the hidden Markov model. The operations also include detecting a location of a second object in a portion of the second image that is outside of the region of interest using the hidden Markov model to avoid re-detection of the first object. The second object is a third aircraft in flight. The operations also include predicting a trajectory of the first and second objects based at least partially upon the location of the first object in the first image, the location of the first object in the second image, and the location of the second object in the second image. The operations also include causing the first aircraft to navigate based at least partially upon the trajectory of the first and second objects.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
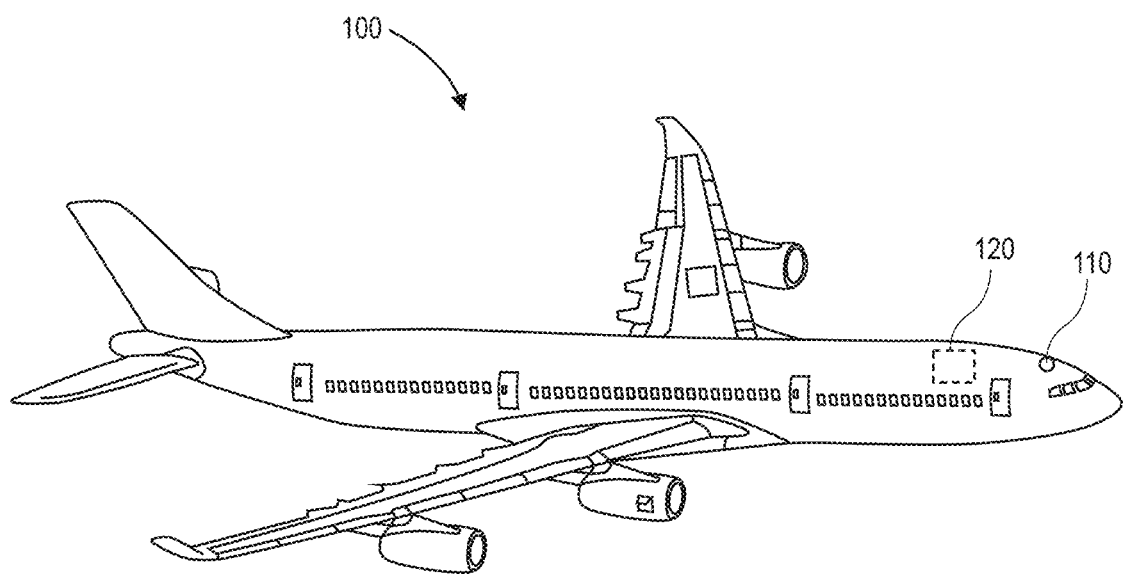
FIG. 1 illustrates a schematic view of a first aircraft in flight, according to an example.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The system and method disclosed herein create an object tracker that can (1) track detected objects after being initialized by a detector, and (2) set the detection probability within the region of the tracked object to 0 for the detector moving forward. This second part frees the hidden Markov model (HMM) track-before-detect model, which would normally fixate on just one detection, to continue searching for more objects within the frame. This is accomplished with the following method, which accepts as input "tracked points," a list of 2D points corresponding to the already-detected points passed in from the morphology-HMM detector, and "detections," a 1-channel image in which each pixel value corresponds to the likelihood that an aircraft is present at that location.

The system and method may be used to detect an object in the air (e.g., in flight). The system and method may be used to sense and avoid the object when the object is non-cooperative such as a bird or a projectile.

FIG. 1 illustrates a schematic view of an aircraft 100 in flight, according to an example. The aircraft 100 may be or include an airplane, a helicopter, an unmanned aerial vehicle (e.g., a drone or a satellite), a spacecraft, or the like. The aircraft 100 may include a camera 110. The camera 110 may be coupled the aircraft 100 and/or positioned within the aircraft 100. The camera 110 may be configured to capture one or more images. The camera 110 may also or instead be configured to capture a continual stream of images over time (i.e. a video). The camera 110 may be configured to capture the video, and the images may be still frames taken from the video. In another example, the camera 110 may not be aboard the aircraft 100. Rather, the camera 110 may be on or coupled to a building such as a control tower. The camera 110 may be mounted to a gimbal steerable to adjust its orientation and/or attitude.

The images and/or video may be transmitted to a computing system 120 on the aircraft 100. In another example, the computing system 120 may be located on the ground (e.g., in a control station) in communication with an onboard computing system. The computing system may be or include one or more processors; and a memory system. The memory system includes one or more non-transitory computer-readable media storing instructions that, when executed by at least one of the one or more processors, cause the computing system to perform operations. The operations are described below with respect to FIG. 2.

Figure 2:
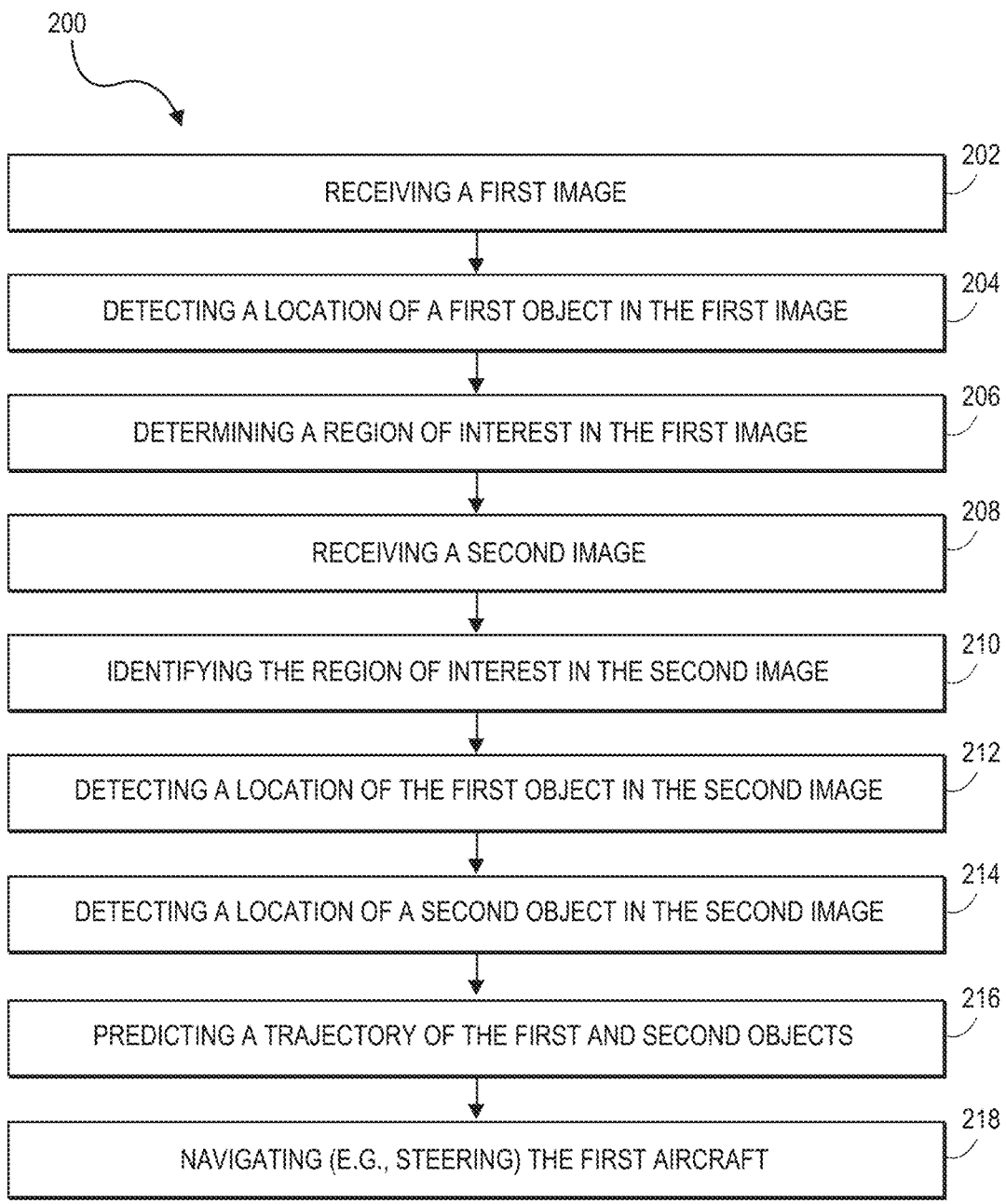
FIG. 2 illustrates a flowchart of a method for detecting and tracking one or more objects, according to an example.

FIG. 2 illustrates a flowchart of a method 200 for detecting and tracking one or more objects, according to an example. More particularly, the method 200 may detect a first object at long range, track the first object after it is detected, and then detect a second object while the first object is being tracked. An illustrative order of the method 200 is described below. One or more steps of the method 200 may be performed in a different order, repeated, or omitted.

Figure 3:
FIG. 3 illustrates a first image captured by a camera on the first aircraft, according to an example.

The method 200 may include receiving or identifying a first image 300, as at 202. An example of the first image 300 is shown in FIG. 3. The first image 300 may be captured by the camera 110 and transmitted to/received by the computing system 120. The camera 110 may be pointed towards the direction of flight such that the first image 300 is in front of the aircraft 100. Thus, the first image 300 may include at least a portion of the flight path of the aircraft 100. The first image 300 may include a non-sky region, such as a ground region 310, a sky region 320, or both. In at least one example, the first image 300 may be in color, and it may be converted to grayscale and/or binary (e.g., black and white). In another example, the first image 300 may be in grayscale and/or binary (e.g., black and white).

Figure 4:
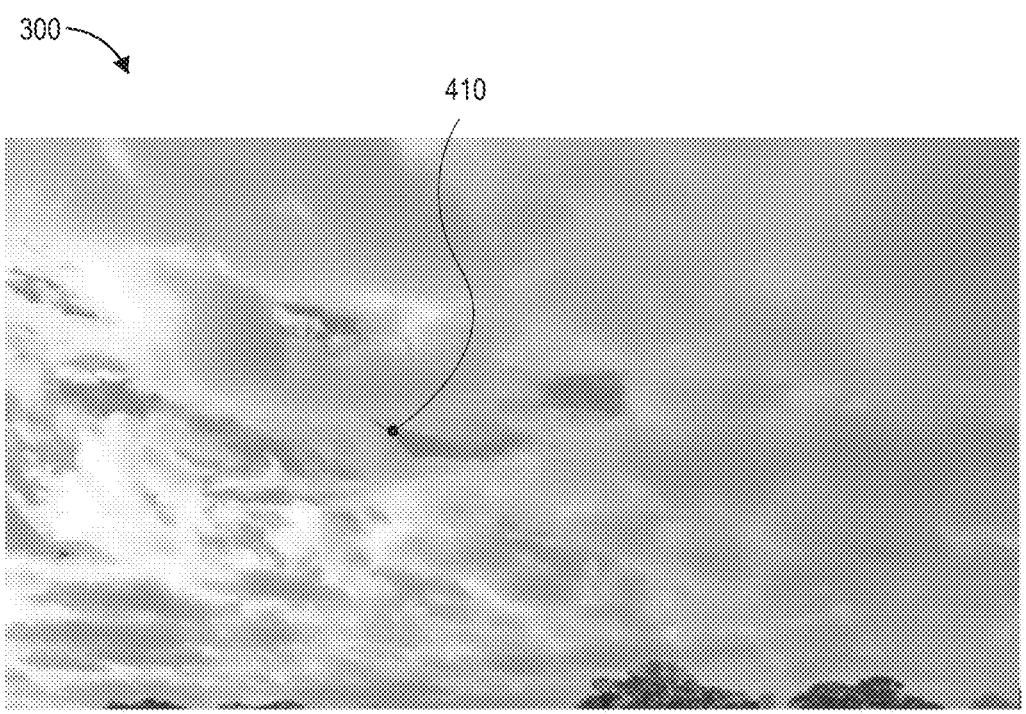
FIG. 4 illustrates the first image with a first object (e.g., a second aircraft) identified therein, according to an example.

The method 200 may also include detecting a location of a first object 410 in the first image 300, as at 204. This step may be performed by the computing system 120. The location of the first object 410 is identified in FIG. 4. The first object 410 may be detected using a hidden Markov model (HMM). More particularly, the first object 410 may be detected using image processing techniques such as morphological opening and closing.

The first object 410 may be or include a second aircraft in flight. In another example, the first object 410 may be one or more flying creatures (e.g., a flock of birds, a swarm of insects, etc.). The first object 410 may be represented by only a few pixels in the first image 300. For example, the first object 410 may be represented by less than 50 pixels, less than 30 pixels, less than 10 pixels, less than 5 pixels, or by a single pixel.

Figure 5:
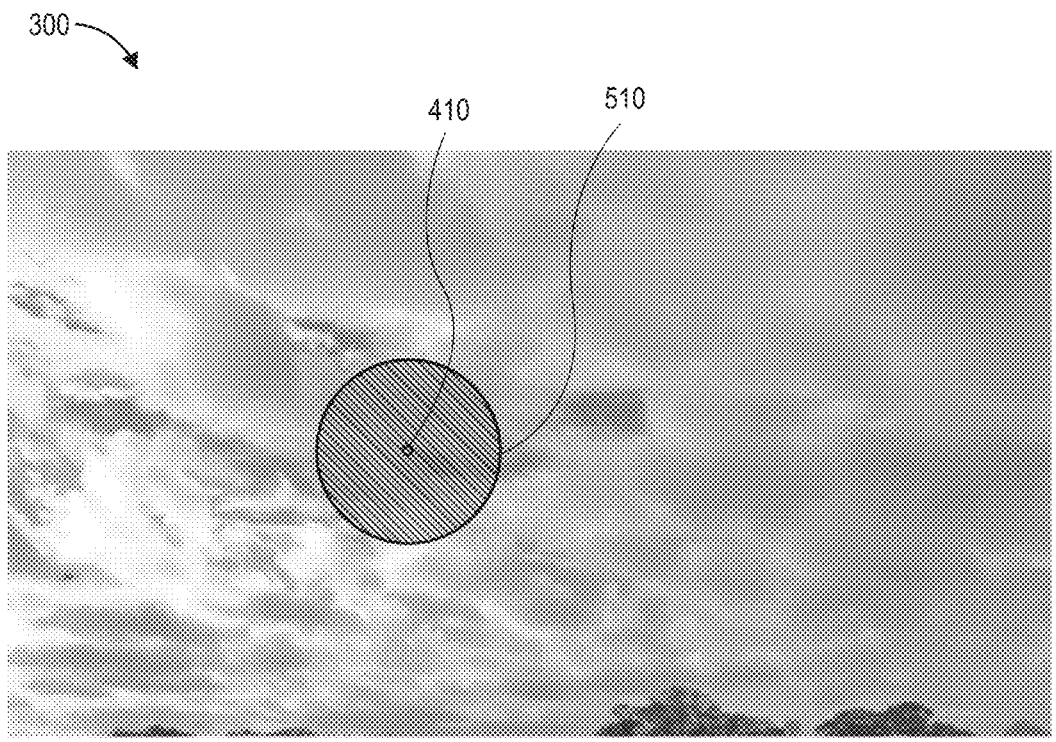
FIG. 5 illustrates the first image with a first region of interest identified around the first object, according to an example.

The method 200 may also include determining a region of interest 510 in the first image 300, as at 206. This step may be performed by the computing system 120. The region of interest 510 is identified in FIG. 5. The region of interest 510 may be determined based at least partially upon the location of the first object 410 in the first image 300. The region of interest 510 may include more pixels than the first object 410. For example, the region of interest 510 may include from 2 pixels to 5 pixels, from 5 pixels to 10 pixels, from 10 pixels to 20 pixels, from 20 pixels to 50 pixels, or from 50 pixels to 100 pixels. The region of interest 510 may include from about 1% to about 2% of the pixels in the first image 300, about 2% to about 4% of the pixels in the first image 300, about 4% to about 6% of the pixels in the first image 300, or about 6% to about 10% of the pixels in the first image 300. The region of interest 510 may include the first object 410. In other words, the first object 410 may be located within the region of interest 510. In the example shown, the region of interest 510 may be substantially circular, and the first object 410 may be located at the center of the circle.

Each pixel in the region of interest 510 may have a probability that is greater than a predetermined threshold that at least a portion of the first object 410 will be located therein at a second time, as discussed below. The pixels in the first image 300 that are outside of the region of interest 510 may have a probability that is less than the predetermined threshold that the first object 410 will be located therein at the second time. As described below, the pixels that are outside of the region of interest 510 may not be considered/analyzed when determining the next location of the first object 410 (e.g., in a second image 600).

In an example, the computing system 120 may include a machine learning (ML) probability model that may be trained to determine the probability that a pixel in the region of interest 510 will include a portion of the first object 410 at the second time. The threshold may vary depending on the change in time between the captured images, the resolution of the images, and/or classification of the detected object (e.g., size, shape, etc.).

Figure 6:
FIG. 6 illustrates a second image captured by the camera on the first aircraft, according to an example.

The method 200 may also include receiving or identifying a second image 600, as at 208. An example of the second image 600 is shown in FIG. 6. The second image 600 may be captured by the camera 110 and transmitted to/received by the computing system 120. The camera 110 may be pointed forward such that the second image 600 is in front of the aircraft 100. Thus, the second image 600 may include at least a portion of the flight path of the aircraft 100. The second image 600 may include the non-sky region 310, the sky region 320, or both. In at least one example, the second image 600 be in color, and it may be converted to grayscale and/or binary (e.g., black and white). In another example, the second image 600 may be in grayscale and/or binary (e.g., black and white).

The second image 600 may be captured after the first image 300. For example, the second image 600 may be captured from about 0.1 seconds to about 1 second after the first image 300, from about 1 second to about 5 seconds after the first image 300, or from about 5 seconds to about 30 seconds after the first image 300, or greater than about 30 seconds after the first image 300. Thus, the second image 600 may also include the first object 410.

Figure 7:
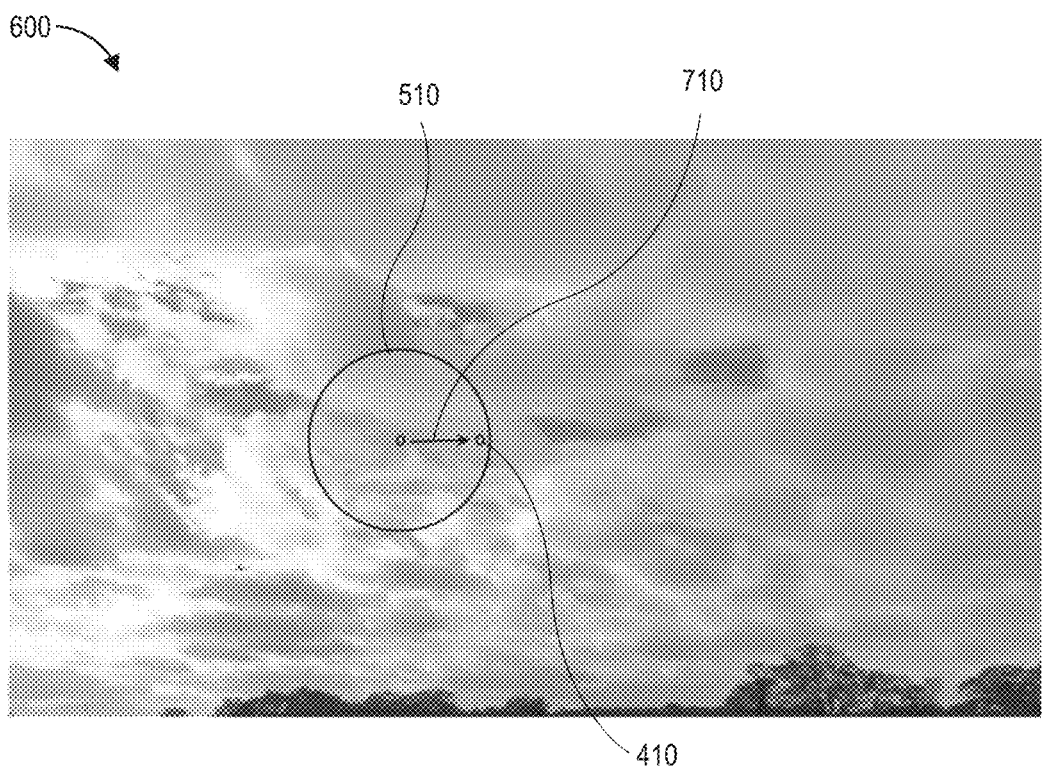
FIG. 7 illustrates the second image with the first object identified therein, according to an example.

The method 200 may also include identifying the region of interest 510 in the second image 600, as at 210. This is shown in FIG. 7. The region of interest 510 may represent the same pixels in the first and second images 300, 600. For example, the center of the region of interest 510 may be 100 pixels to the right (from the left of the image) and 50 pixels down (from the top of the image) in both images 300, 600.

The method 200 may also include detecting a location of the first object 410 in the second image 600, as at 212. This step may be performed by the computing system 120. The first object 410 is identified in FIG. 7. The detection of the first object 410 may only occur within the region of interest 510 in the second mage 600. The pixels outside of the region of interest 510 may not be analyzed to detect the location of the first object 410 in the second image 600. This may be computationally more efficient than trying to detect the first object 410 in the entire second image 600. The first object 410 may be detected using the HMM.

The first object 410 may be represented by at least one pixel or only a few pixels in the second image 600. For example, the first object 410 may be represented by less than 50 pixels, less than 30 pixels, less than 10 pixels, less than 5 pixels, or by a single pixel. The base of the arrow 710 shows where the first object 410 was in the first image 300, and the head of the arrow 710 shows where the first object 410 is in the second image 600. Thus, the arrow 710 shows the distance that the first object 410 has moved from the first image 300 to the second image 600. Said another way, the arrow 710 shows the distance that the first object 410 has moved from the first time (e.g., when the first image 300 was captured) to the second time (e.g., when the second image 600 was captured).

Figure 8:
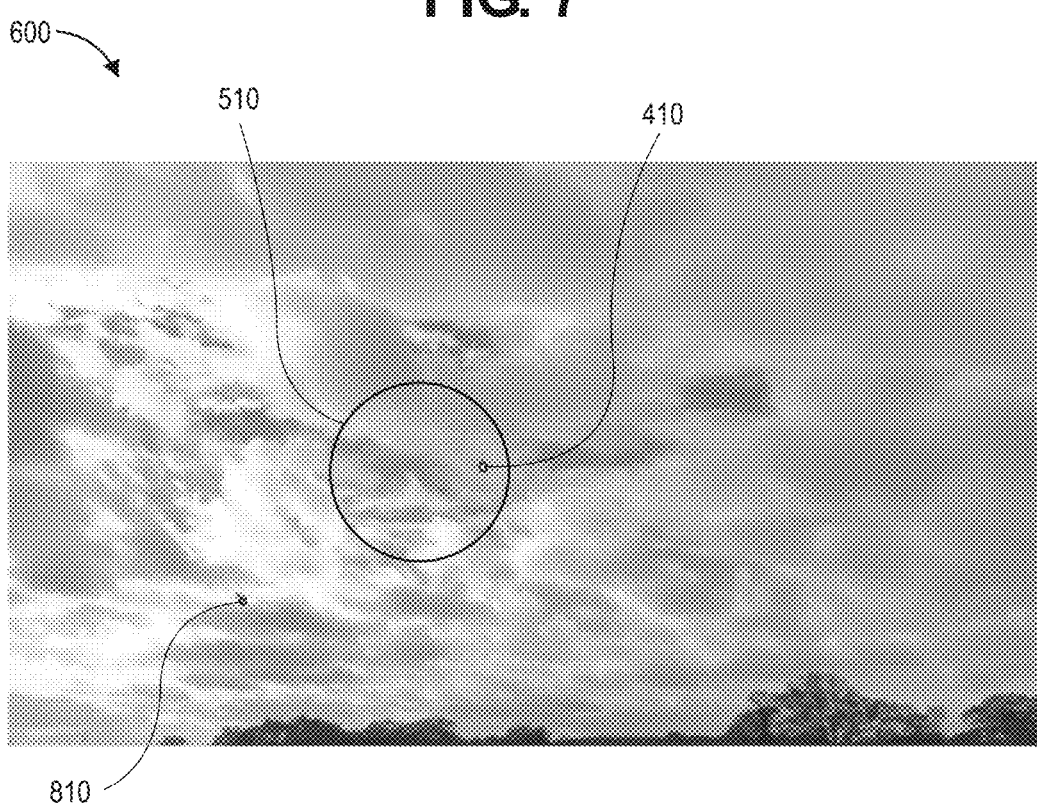
FIG. 8 illustrates the second image with a second object (e.g., a third aircraft) identified therein, according to an example.

The method 200 may also include detecting a location of a second object 810 in the second image 600, as at 214. This step may be performed by the computing system 120. The location of the second object 810 is identified in FIG. 8. The second object 810 may also be detected using the HMI.

The second object 810 may be detected in a portion of the second image 600 that is outside of the region of interest 510 to avoid re-detection of the first object 410. More particularly, HMM object trackers can track only one object at a time. The method 200 allows the first object 410 to be tracked while the second object 810 is detected and/or tracked. The second object 810 may be different than the first object 410. For example, the second object 810 may be or include a third aircraft in flight. In another example, the second object 810 may be one or more flying creatures (e.g., a flock of birds, a swarm of insects, etc.).

The method 200 may also include predicting a route and/or a trajectory of the first and second objects 410, 810, as at 216. This step may be performed by the computing system 120. The route may be or include a series of waypoints that describe the path the aircraft 100 will take. A path may be or include where the aircraft 100 is flying and will fly over the course of the mission. A trajectory may be or include a series of aircraft positions and velocities that represent the path of the aircraft with respect to time. For example, the trajectory may be an interpolation of the route with an additional time component. The trajectory of the first object 410 may be predicted based at least partially upon the location(s) of the first object 410 in the first image 300, the second image 600, or both. The trajectory of the second object 810 may be predicted based at least partially upon the location of the second object 810 in the second image 600.

The method 200 may also include navigating (e.g., steering) the first aircraft 100, as at 218. The aircraft 100 may be navigated (e.g., steered) based at least partially upon the first image 300, the location of the first object 410 in the first image 300, the second image 600, the location of the first object 410 in the second image 600, the location of the second object 810 in the second image 600, the predicted trajectory of the first object 410, the predicted trajectory of the second object 810, or a combination thereof. For example, the aircraft 100 may be navigated (e.g., steered) to avoid a collision path with the first object 410 and/or the second object 810. The navigation may be performed (e.g., automatically) by the computing system 120. In another example, the navigation may be performed by a user. The user may be in the aircraft 100 (e.g., a pilot), or the user may be on the ground and steering the aircraft 100 remotely.

The method 200 may be iterative. For example, the method 200 may also include determining first and second regions of interest in the second image 600. The first region of interest may include the first object 410, and the second region of interest may include the second object. The first region of interest in the second image 600 may be different than the region of interest 510 in the second image 600. More particularly, the first object 410 may be located at a center or near the center of the first region of interest in the second image 600. The first region of interest in the second image 600 may at least partially overlap the region of interest 510 in the second image 600.

The method 200 may then include receiving a third image that is captured after the first and second images 300, 600. The method 200 may then include identifying the first and second regions of interest in the third image. The method 200 may then include detecting the locations of the first and second objects 410, 810 in the third image. The detection of the first object 410 may only occur within the first region of interest in the third image, and the detection of the second object 810 may only occur within the second region of interest in the third image. The method 200 may then include detecting a location of a third object in the third image. The third object may be detected in a portion of the third image that is outside of the first and second regions of interest 510 to avoid re-detection of the first and second objects 410, 810. The third object 810 may be different than the first and second objects 410, 810. For example, the third object may be or include a fourth aircraft in flight. In another example, the third object may be one or more flying creatures (e.g., a flock of birds, a swarm of insects, etc.).

The method 200 may then include predicting the trajectory of the first object 410, the second object 810, and the third object. For example, this may include updating the predicted trajectory of the first object 410 based at least partially upon the first image 300, the location of the first object 410 in the first image 300, the second image 600, the location of the first object 410 in the second image 600, the third image, the location of the first object in the third image, the predicted trajectory of the first object 410 (from step 216), or a combination thereof. This may also include updating the updating the predicted trajectory of the second object 810 based at least partially upon the second image 600, the location of the second object 810 in the second image 600, the third image, the location of the second object 810 in the third image, the predicted trajectory of the second object 810 (from step 216), or a combination thereof. This may also include predicting the trajectory of the third object based at least partially upon the third image, the location of the third object in the third image, or a combination thereof. The method 200 may then include adjusting the navigation (e.g., steering) of the first aircraft 100 based at least partially upon the predicted trajectories. In another example, the method 200 may instead include adjusting the camera 110 using the gimbal.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more examples, alterations and/or modifications can be made to the illustrated examples without departing from the spirit and scope of the appended claims. In addition, while a particular feature of the present teachings may have been disclosed with respect to only one of several examples, such feature may be combined with one or more other features of the other examples as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

Clause 1: A method, comprising: identifying a first image that is captured at a first time; detecting a location of a first object in the first image; determining a region of interest based at least partially upon the location of the first object in the first image; identifying a second image that is captured at a second time; identifying the region of interest in the second image; and detecting a location of a second object in a portion of the second image that is outside of the region of interest.

Clause 2: The method of Clause 1, wherein the first image is captured by a camera on an aircraft.

Clause 3: The method of Clause 1 or 2, wherein the first object is an aircraft in flight.

Clause 4: The method of any of Clauses 1-3, wherein the first object is represented as at least a pixel in the first image.

Clause 5: The method of any of Clauses 1-4, wherein the region of interest comprises a plurality of pixels in the first image, and wherein the first object is located within the plurality of pixels.

Clause 6: The method of any of Clauses 1-5, wherein each pixel in the region of interest has a probability that is greater than a predetermined threshold that the first object will be located therein at the second time, wherein each pixel that is outside of the region of interest has a probability that is less than the predetermined threshold that the first object will be located therein at the second time, and wherein the second time is after the first time.

Clause 7: The method of any of Clauses 1-6, wherein the region of interest comprises a circle, and wherein the first object is located at a center of the circle in the first image.

Clause 8: The method of any of Clauses 1-7, further comprising detecting a location of the first object in the region of interest in second image, wherein the first object is not located at the center of the circle in the second image.

Clause 9: The method of Clause 8, further comprising predicting a trajectory of the first object based at least partially upon the location of the first object in the first and second images.

Clause 10: The method of Clause 9, further comprising navigating an aircraft based at least partially upon the trajectory of the first object.

Clause 11: A computing system comprising: one or more processors; and a memory system comprising one or more non-transitory computer-readable media storing instructions that, when executed by at least one of the one or more processors, cause the computing system to perform operations, the operations comprising: identifying a first image, wherein the first image is captured by a camera on a first aircraft at a first time; detecting a location of a first object in the first image, wherein the first object is moving; determining a region of interest based at least partially upon the location of the first object in the first image, wherein the region of interest comprises a plurality of pixels in the first image, and wherein each pixel in the region of interest has a probability that is greater than a predetermined threshold that the first object will be located therein at a second time; identifying a second image, wherein the second image is captured by the camera on the first aircraft at the second time; identifying the region of interest in the second image; and detecting a location of a second object in a portion of the second image that is outside of the region of interest, wherein the second object is moving.

Clause 12: The computing system of Clause 11, wherein the location of the first object in the first image is detected using a hidden Markov model that analyzes the entire first image.

Clause 13: The computing system of Clause 12, wherein the location of the second object in the second image is detected using the hidden Markov model that analyzes only the portion of the second image that is outside of the region of interest.

Clause 14: The computing system of Clause 13, further comprising detecting a location of the first object in the region of interest in the second image, wherein the location of the first object in the second image is detected using the hidden Markov model that analyzes only the region of interest in the second image.

Clause 15: The computing system of Clause 14, further comprising: predicting a trajectory of the first object and the second object based at least partially upon the location of the first object in the first image, the location of the first object in the second image, and the location of the second object in the second image; and causing the first aircraft to navigate based at least partially upon the trajectory of the first and second objects.

Clause 16: A computing system comprising: one or more processors; and a memory system comprising one or more non-transitory computer-readable media storing instructions that, when executed by at least one of the one or more processors, cause the computing system to perform operations, the operations comprising: identifying a first image, wherein the first image is captured by a camera on a first aircraft at a first time; detecting a location of a first object in the first image using a hidden Markov model, wherein the first object is a second aircraft in flight, and wherein the first object is represented as five or fewer pixels in the first image; determining a region of interest based at least partially upon the location of the first object in the first image, wherein the first object is located within the region of interest, wherein the region of interest comprises a plurality of pixels in the first image, wherein each pixel in the region of interest has a probability that is greater than a predetermined threshold that the first object will be located therein at a second time, and wherein the second time is after the first time; identifying a second image, wherein the second image is captured by the camera on the first aircraft at the second time; identifying the region of interest in the second image; detecting the location of the first object in the region of interest in the second image using the hidden Markov model; detecting a location of a second object in a portion of the second image that is outside of the region of interest using the hidden Markov model to avoid re-detection of the first object, and wherein the second object is a third aircraft in flight; predicting a trajectory of the first and second objects based at least partially upon the location of the first object in the first image, the location of the first object in the second image, and the location of the second object in the second image; and causing the first aircraft to navigate based at least partially upon the trajectory of the first and second objects.

Clause 17: The computing system of Clause 16, further comprising: determining a first region of interest in the second image based at least partially upon the location of the first object in the second image, wherein the first object is located at a center of the first region of interest in the second image; and determining a second region of interest in the second image based at least partially upon the location of the second object in the second image, wherein the second object is located at a center of the second region of interest in the second image.

Clause 18: The computing system of Clause 17, further comprising: identifying a third image, wherein the third image is captured by the camera on the first aircraft at a third time; identifying the first and second regions of interest in the third image; detecting the location of the first object in the first region of interest in the third image; and detecting the location of the second object in the second region of interest in the third image.

Clause 19: The computing system of Clause 18, further comprising further comprising detecting a location of a third object in a portion of the third image that is outside of the first and second regions of interest, to avoid re-detection of the first and second objects.

Clause 20: The computing system of Clause 19, further comprising causing the first aircraft to navigate based at least partially upon a location or a trajectory of the third object.

What is claimed is:

1. A method, comprising:
   identifying a first image that is captured by a camera at a first time;
   detecting a location of a first moving object in the first image;
   determining a region of interest based at least partially upon the location of the first moving object in the first image, wherein the region of interest comprises a plurality of pixels in the first image, and wherein each pixel in the region of interest has a probability that is greater than a predetermined threshold that the first moving object will be located therein at a second time;
   identifying a second image that is captured by the camera at the second time;
   identifying the region of interest in the second image;
   detecting a location of a second moving object in a portion of the second image that is outside of the region of interest.

2. The method of claim 1, wherein the first image is captured by a camera on an aircraft.

3. The method of claim 1, wherein the first moving object is an aircraft in flight.

4. The method of claim 1, wherein the first moving object is represented as at least a pixel in the first image.

5. The method of claim 1, wherein the region of interest comprises a plurality of pixels in the first image, and wherein the first moving object is located within the plurality of pixels.

6. The method of claim 1, wherein each pixel in the region of interest has a probability that is greater than a predetermined threshold that the first moving object will be located therein at the second time, wherein each pixel that is outside of the region of interest has a probability that is less than the predetermined threshold that the first moving object will be located therein at the second time, and wherein the second time is after the first time.

7. The method of claim 1, wherein the region of interest comprises a circle, and wherein the first moving object is located at a center of the circle in the first image.

8. The method of claim 1, further comprising detecting a location of the first moving object in the region of interest in second image, wherein the first moving object is not located at the center of the circle in the second image.

9. The method of claim 8, further comprising predicting a trajectory of the first moving object based at least partially upon the location of the first moving object in the first and second images.

10. The method of claim 9, further comprising navigating an aircraft based at least partially upon the trajectory of the first moving object.

11. A computing system comprising:
one or more processors; and
a memory system comprising one or more non-transitory computer-readable media storing instructions that, when executed by at least one of the one or more processors, cause the computing system to perform operations, the operations comprising:
identifying a first image, wherein the first image is captured by a camera on a first aircraft at a first time;
detecting a location of a first object in the first image, wherein the first object is moving;
determining a region of interest based at least partially upon the location of the first object in the first image, wherein the region of interest comprises a plurality of pixels in the first image, and wherein each pixel in the region of interest has a probability that is greater than a predetermined threshold that the first object will be located therein at a second time;
identifying a second image, wherein the second image is captured by the camera on the first aircraft at the second time;
identifying the region of interest in the second image; and
detecting a location of a second object in a portion of the second image that is outside of the region of interest, wherein the second object is moving.

12. The computing system of claim 11, wherein the location of the first object in the first image is detected using a hidden Markov model that analyzes the entire first image.

13. The computing system of claim 12, wherein the location of the second object in the second image is detected using the hidden Markov model that analyzes only the portion of the second image that is outside of the region of interest.

14. The computing system of claim 13, further comprising detecting a location of the first object in the region of interest in the second image, wherein the location of the first object in the second image is detected using the hidden Markov model that analyzes only the region of interest in the second image.

15. The computing system of claim 14, further comprising:
predicting a trajectory of the first object and the second object based at least partially upon the location of the first object in the first image, the location of the first object in the second image, and the location of the second object in the second image; and
causing the first aircraft to navigate based at least partially upon the trajectory of the first and second objects.

16. A computing system comprising:
one or more processors; and
a memory system comprising one or more non-transitory computer-readable media storing instructions that, when executed by at least one of the one or more processors, cause the computing system to perform operations, the operations comprising:
identifying a first image, wherein the first image is captured by a camera on a first aircraft at a first time;
detecting a location of a first object in the first image using a hidden Markov model, wherein the first object is a second aircraft in flight, and wherein the first object is represented as five or fewer pixels in the first image;
determining a region of interest based at least partially upon the location of the first object in the first image, wherein the first object is located within the region of interest, wherein the region of interest comprises a plurality of pixels in the first image, wherein each pixel in the region of interest has a probability that is greater than a predetermined threshold that the first object will be located therein at a second time, and wherein the second time is after the first time;
identifying a second image, wherein the second image is captured by the camera on the first aircraft at the second time;
identifying the region of interest in the second image;
detecting the location of the first object in the region of interest in the second image using the hidden Markov model;
detecting a location of a second object in a portion of the second image that is outside of the region of interest using the hidden Markov model to avoid re-detection of the first object, wherein the second object is a third aircraft in flight;
predicting a trajectory of the first and second objects based at least partially upon the location of the first object in the first image, the location of the first object in the second image, and the location of the second object in the second image; and
causing the first aircraft to navigate based at least partially upon the trajectory of the first and second objects.

17. The computing system of claim 16, further comprising:
determining a first region of interest in the second image based at least partially upon the location of the first object in the second image, wherein the first object is located at a center of the first region of interest in the second image; and
determining a second region of interest in the second image based at least partially upon the location of the second object in the second image, wherein the second object is located at a center of the second region of interest in the second image.

18. The computing system of claim 17, further comprising:
identifying a third image, wherein the third image is captured by the camera on the first aircraft at a third time;
identifying the first and second regions of interest in the third image;
detecting the location of the first object in the first region of interest in the third image; and
detecting the location of the second object in the second region of interest in the third image.

19. The computing system of claim 18, further comprising further comprising detecting a location of a third object in a portion of the third image that is outside of the first and second regions of interest, to avoid re-detection of the first and second objects.

20. The computing system of claim 19, further comprising causing the first aircraft to navigate based at least partially upon a location or a trajectory of the third object.

\* \* \* \* \*